United States Patent
Choquette et al.

(10) Patent No.: US 9,798,548 B2
(45) Date of Patent: Oct. 24, 2017

(54) METHODS AND APPARATUS FOR SCHEDULING INSTRUCTIONS USING PRE-DECODE DATA

(75) Inventors: Jack Hilaire Choquette, Palo Alto, CA (US); Robert J. Stoll, Los Altos, CA (US); Olivier Giroux, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 974 days.

(21) Appl. No.: 13/333,879

(22) Filed: Dec. 21, 2011

(65) Prior Publication Data
US 2013/0166881 A1    Jun. 27, 2013

(51) Int. Cl.
G06F 15/00    (2006.01)
G06F 9/30    (2006.01)
G06F 9/40    (2006.01)
G06F 9/38    (2006.01)

(52) U.S. Cl.
CPC ............ *G06F 9/3851* (2013.01); *G06F 9/382* (2013.01); *G06F 9/3802* (2013.01)

(58) Field of Classification Search
CPC ...... G06F 9/3885; G06F 9/3887; G06F 9/382; G06F 9/3836; G06F 9/3851; G06F 9/4843; G06F 9/52; G06F 9/4887; G06T 1/20; G06T 15/005; G06T 2210/52; G09G 5/363; G09G 5/006; G06G 9/4881
USPC ................................................. 712/214, 213
See application file for complete search history.

(56) References Cited

U.S. PATENT DOCUMENTS 5,687,339 A * 11/1997 Hwang ......................... 712/207
5,845,101 A * 12/1998 Johnson et al. ............. 712/207
6,367,002 B1    4/2002 Birkhauser
7,237,094 B2    6/2007 Curran et al.
(Continued)

FOREIGN PATENT DOCUMENTS

CN        1760826 A    4/2006
CN      101877120 A    11/2010
(Continued)

OTHER PUBLICATIONS

NVidia, NVidia's Next Generation CUDA Compute Architecture: Fermi, 2009, pp. 1-21.*
(Continued)

*Primary Examiner* — George Giroux
(74) *Attorney, Agent, or Firm* — Artegis Law Group, LLP

(57) ABSTRACT

Systems and methods for scheduling instructions using pre-decode data corresponding to each instruction. In one embodiment, a multi-core processor includes a scheduling unit in each core for selecting instructions from two or more threads each scheduling cycle for execution on that particular core. As threads are scheduled for execution on the core, instructions from the threads are fetched into a buffer without being decoded. The pre-decode data is determined by a compiler and is extracted by the scheduling unit during runtime and used to control selection of threads for execution. The pre-decode data may specify a number of scheduling cycles to wait before scheduling the instruction. The pre-decode data may also specify a scheduling priority for the instruction. Once the scheduling unit selects an instruction to issue for execution, a decode unit fully decodes the instruction.

20 Claims, 9 Drawing Sheets

(56) References Cited

U.S. PATENT DOCUMENTS

| | | |
|---|---|---|
| 7,284,117 B1 | 10/2007 | Radharkrishnan et al. |
| 2002/0087821 A1* | 7/2002 | Saulsbury et al. ............ 711/170 |
| 2003/0101336 A1* | 5/2003 | Kosche et al. ................ 712/244 |
| 2003/0120883 A1* | 6/2003 | Farrall .................. G06F 9/3802 711/169 |
| 2003/0212881 A1* | 11/2003 | Walterscheidt et al. ...... 712/226 |
| 2004/0064756 A1* | 4/2004 | Kadambi ............ G06F 11/1497 714/17 |
| 2004/0117597 A1 | 6/2004 | Kailas |
| 2006/0037021 A1* | 2/2006 | Anand et al. ................. 718/102 |
| 2006/0080643 A1* | 4/2006 | Ogawa .................... G06F 8/423 717/126 |
| 2006/0179281 A1 | 8/2006 | Jensen et al. |
| 2006/0242645 A1* | 10/2006 | Codrescu et al. ............. 718/102 |
| 2007/0124732 A1* | 5/2007 | Lia ........................ G06F 9/4881 718/102 |
| 2007/0226464 A1 | 9/2007 | Chaudhry et al. |
| 2008/0256338 A1 | 10/2008 | Suggs |
| 2008/0301409 A1* | 12/2008 | May ............................. 712/206 |
| 2009/0119485 A1 | 5/2009 | Smith et al. |
| 2009/0187744 A1* | 7/2009 | Greenhalgh ................. 712/213 |
| 2009/0241097 A1* | 9/2009 | Wang .................... G06F 9/3004 717/145 |
| 2010/0201703 A1 | 8/2010 | Jiao |
| 2011/0072243 A1 | 3/2011 | Qiu et al. |
| 2011/0078427 A1 | 3/2011 | Snehanow et al. |

FOREIGN PATENT DOCUMENTS

| | | |
|---|---|---|
| GB | 2466984 A | 7/2010 |
| TW | 200939117 A | 9/2009 |
| TW | 200941340 A | 10/2009 |
| TW | 201101178 A | 1/2011 |

OTHER PUBLICATIONS

Gebhart, Energy-efficient Mechanisms for Managing Thread Context in Throughput Processors, Jun. 4-8, 2011, pp. 1-11.*
Non-Final Office Action for U.S. Appl. No. 13/335,872, dated Dec. 3, 2014, 24 pages.
Final Office Action for U.S. Appl. No. 13/335,872, dated Apr. 7, 2015, 27 pages.
Non-Final Office Action for U.S. Appl. No. 13/335,872, dated Jul. 15, 2016, 31 pages.
Gebhart, "Energy-efficient mechanisms for managing thread context in throughput processors", 2011 38th Annual International Symposium on Computer Architecture, from p. 235 to p. 245, Jun. 201, 12 pages.

* cited by examiner

METHODS AND APPARATUS FOR SCHEDULING INSTRUCTIONS USING PRE-DECODE DATA

BACKGROUND OF THE INVENTION

Field of the Invention

The disclosure generally relates to multi-threaded instruction scheduling, and more specifically to methods and apparatus for scheduling instructions using pre-decode data.

Description of the Related Art

Parallel processors have multiple independent cores that enable multiple threads to be executed simultaneously using different hardware resources. SIMD (single instruction, multiple data) architecture processors execute the same instruction on each of the multiple cores where each core processes different input data. MIMD (multiple instruction, multiple data) architecture processors execute different instructions on different cores with different input data supplied to each core. Parallel processors may also be multi-threaded, which enables two or more threads to execute substantially simultaneously using the resources of a single processing core (i.e., the different threads are executed on the core during different clock cycles). Instruction scheduling refers to the technique for determining which threads to execute on which cores during the next clock cycle.

Typically, instruction scheduling algorithms will decode a plurality of instructions after fetching the instructions from memory to determine the particular resources required for each specific operation and the latencies associated with those resources. The system may then evaluate the latencies to determine the optimal scheduling order for the plurality of instructions. For example, one instruction may specify an operand (i.e., a register value) that is dependent on a calculation being executed by a previous instruction from the same thread. The scheduler then delays execution of the one instruction until the previous instruction completes execution.

One problem with the above described systems is that decoding a plurality of instructions, identifying dependencies between the instructions, and analyzing the latencies associated with all of the computations specified by the instructions requires a lot of management resources in the processor and a large amount of state information storage. The processor may determine the specific opcodes specified by the instructions, the resources associated with the operations (e.g., the specific registers passed as operands to each instruction), the interdependencies between instructions, and any other important data associated with the instructions. The implementation of such algorithms may take many clock cycles to complete and a lot of memory for storing and decoding instructions.

Accordingly, what is needed in the art is a system and method for performing instruction scheduling without having to determine the latencies for computations that are inputs to other instructions.

SUMMARY OF THE INVENTION

In one embodiment, a multi-core processor includes a scheduling unit in each core for selecting instructions from two or more threads each scheduling cycle for execution on that particular core. As threads are scheduled for execution on the core, instructions from the threads are fetched into a buffer without being decoded. The pre-decode data is determined by a compiler and at runtime, the pre-decode data is extracted by the scheduling unit and used to control selection of threads for execution. The pre-code data may specify a number of scheduling cycles to wait before issuing the instruction. The pre-decode data may also specify a scheduling priority for the instruction or that two instructions should be issued in a single scheduling cycle. Once the scheduling unit has selected an instruction to issue for execution, a decode unit fully decodes the instruction.

One example embodiment of the disclosure sets forth a computer-implemented method for scheduling instructions within a parallel computing machine. The method includes the steps of fetching instructions corresponding to two or more thread groups from an instruction cache unit, and receiving pre-decode data associated with each of the instructions, where the pre-decode data is determined when the instructions are compiled. The steps further include selecting an instruction for execution based at least in part on the pre-decode data, decoding the instruction, and dispatching the instruction to the parallel processing unit for execution.

Another example embodiment of the disclosure sets forth a scheduling unit comprising an instruction cache fetch unit, a macro-scheduler unit, a micro-scheduler arbiter, a decode unit, and a dispatch unit. The instruction cache fetch unit is configured to route instructions corresponding to two or more thread groups to a first buffer and route pre-decode data associated with each one of the instructions to a second buffer. The macro-scheduler unit is coupled to the instruction cache fetch unit and configured to receive pre-decode data, wherein the pre-decode data is determined when the instructions are compiled. The micro-scheduler arbiter is coupled to the macro-scheduler unit and the second buffer and configured to select, at runtime, a first instruction for execution by a processing unit based at least in part on the pre-decode data. The decode unit coupled to the first buffer and configured to decode the first instruction. The dispatch unit coupled to the decode unit and configured to dispatch the first instruction to a processing unit for execution.

Yet another example embodiment of the disclosure sets forth a computing device that includes a central processing unit and a parallel processing unit. The parallel processing unit includes a scheduling unit configured to fetch a plurality of instructions corresponding to two or more thread groups from an instruction cache unit, and receive pre-decode data associated with each of the instructions, where the pre-decode data is determined when the instructions are compiled. The scheduling unit is further configured to select an instruction for execution based at least in part on the pre-decode data, decode the instruction, and dispatch the instruction to the parallel processing unit for execution.

Advantageously, using the pre-decode data corresponding to each instruction relieves the workload on the scheduling unit. In particular, the scheduling unit no longer needs to identify dependencies between the instructions, and analyze the latencies associated with all of the computations specified by the instructions. Therefore, the amount off management resources in the processor is reduced and the amount of state information that is maintained by the scheduling unit is reduced.

BRIEF DESCRIPTION OF THE DRAWINGS

So that the manner in which the above recited features of the present disclosure can be understood in detail, a more particular description, briefly summarized above, may be had by reference to example embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

The present disclosure describes systems and methods for scheduling instructions for execution on a processor core prior to decoding the instructions. In one embodiment, a multi-core processor includes a scheduling unit in each core for scheduling instructions from two or more threads on that particular core. As threads are scheduled for execution and issued to a processor core, instructions from the threads are fetched from an instruction cache into a buffer without being decoded. The scheduling unit includes a macro-scheduler unit for performing a priority sort of thread groups executing the same or different sets of instructions. A micro-scheduler arbiter determines selects at least one instruction from one of the thread groups each scheduling cycle and issues the at least one instruction for execution. The micro-scheduler arbiter uses pre-decode data to implement the scheduling algorithm. The pre-decode data is determined at compile time for each instruction. At runtime, the pre-decode data is extracted by decoding only a small portion of the instruction. Alternately, the pre-decode data may be received along with the instruction such as embedded in the same cache line as the instruction. Once the micro-scheduler arbiter has selected an instruction to issue to the execution unit, a decode unit fully decodes the instruction.

System Overview

Figure 1:
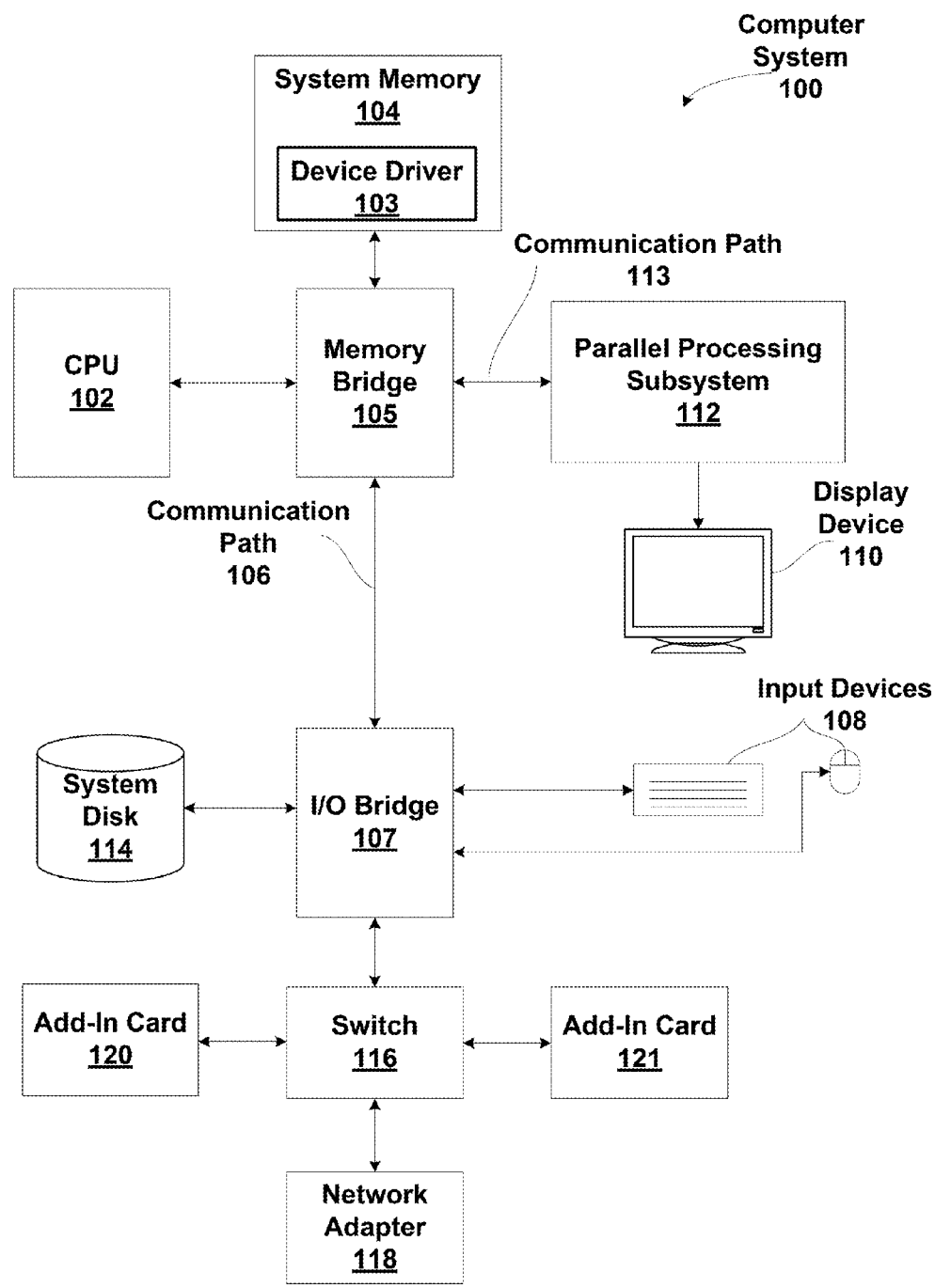
FIG. 1 is a block diagram illustrating a computer system configured to implement one or more aspects of the present disclosure.

FIG. 1 is a block diagram illustrating a computer system 100 configured to implement one or more aspects of the present disclosure. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communications paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
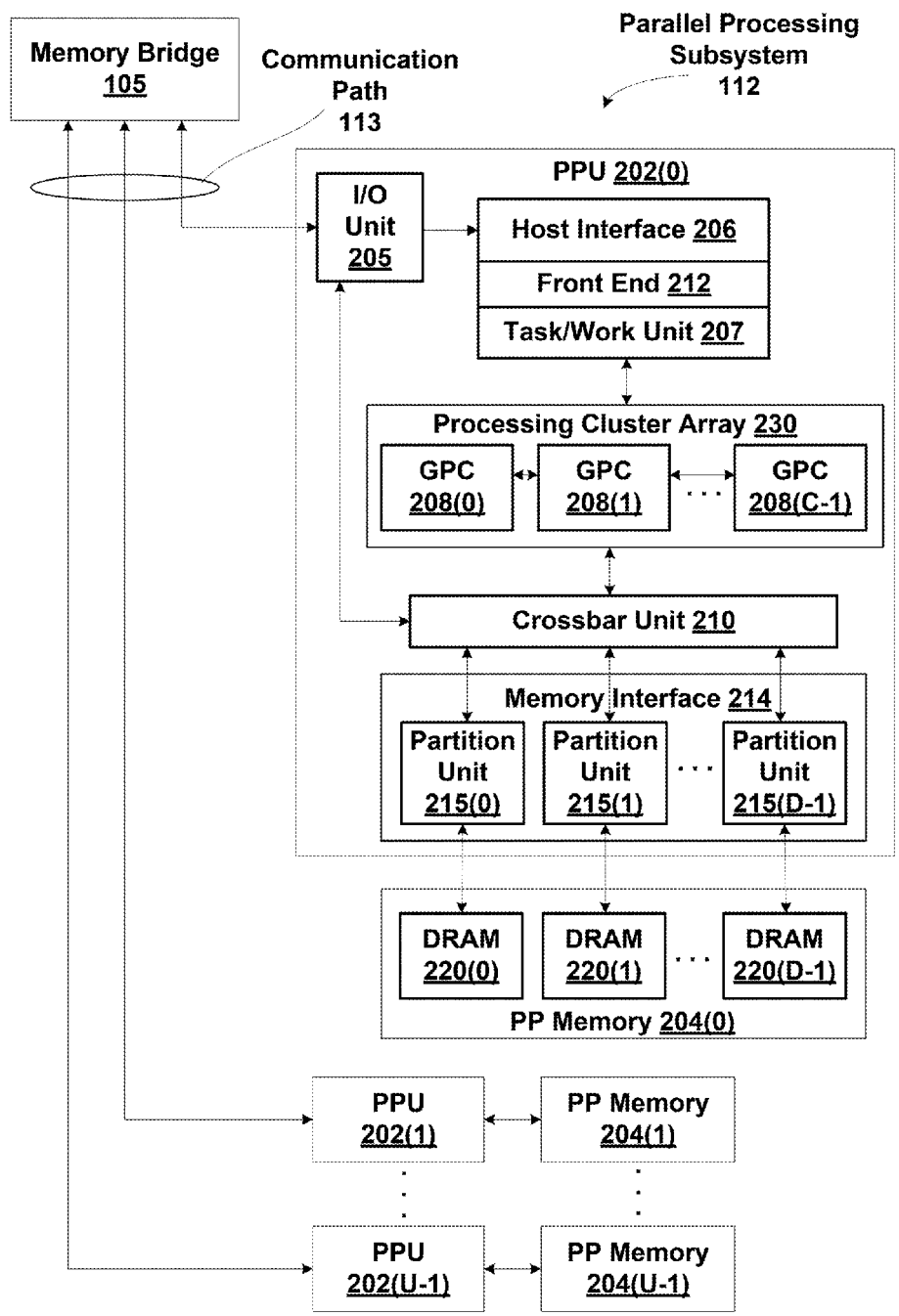
FIG. 2 is a block diagram of a parallel processing subsystem for the computer system of FIG. 1, according to one embodiment of the present disclosure.

FIG. 2 illustrates a parallel processing subsystem 112, according to one embodiment of the present disclosure. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
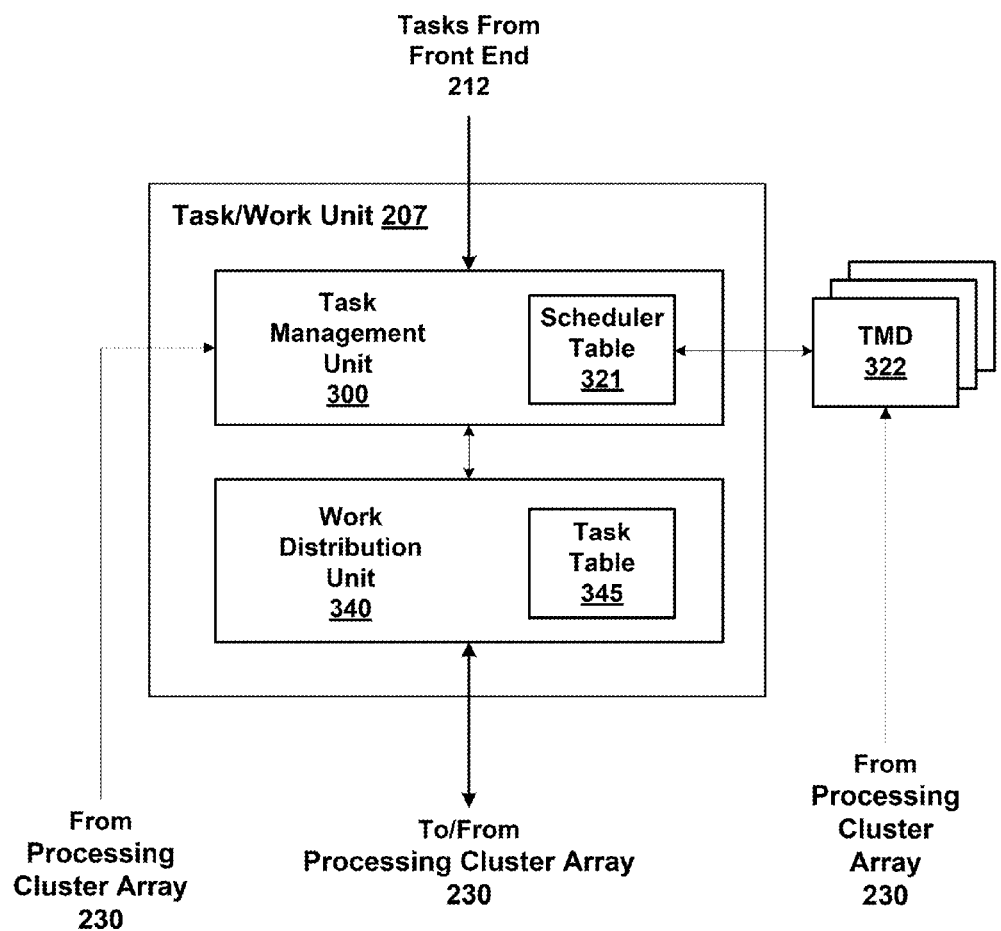
FIG. 3A is a block diagram of the front end of FIG. 2, according to one embodiment of the present disclosure.

FIG. 3A is a block diagram of the task/work unit 207 of FIG. 2, according to one embodiment of the present disclosure. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
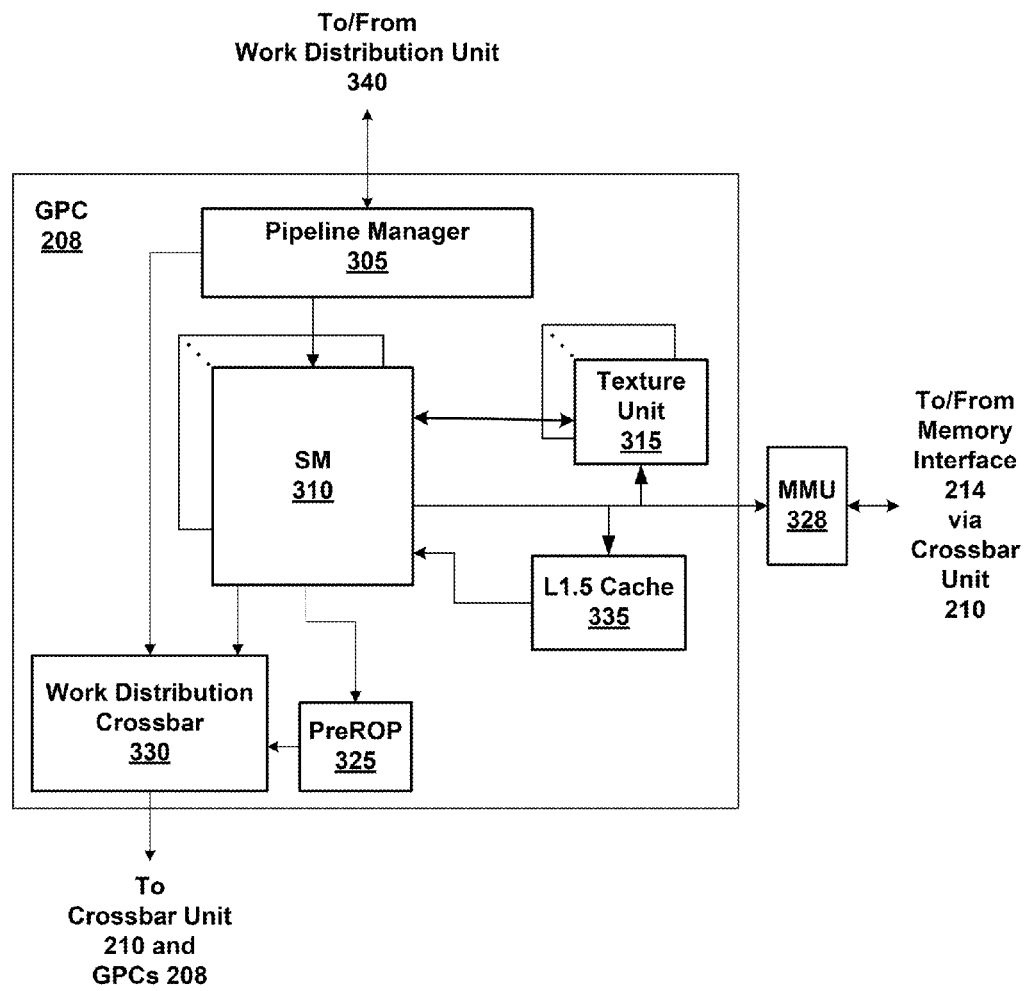
FIG. 3B is a block diagram of a general processing cluster within one of the parallel processing units of FIG. 2, according to one embodiment of the present disclosure.

FIG. 3B is a block diagram of a GPC 208 within one of the PPUs 202 of FIG. 2, according to one embodiment of the present disclosure. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
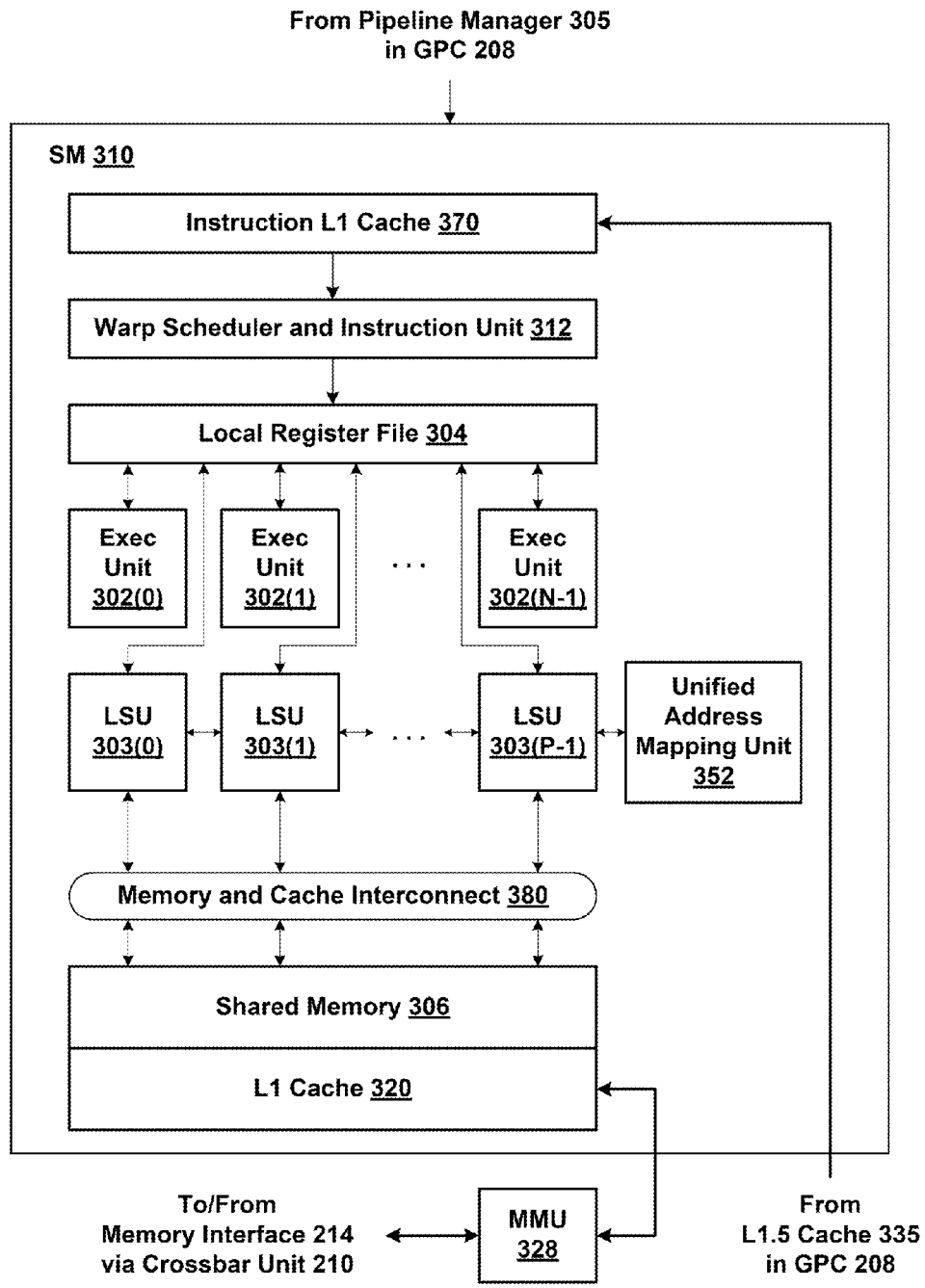
FIG. 3C is a block diagram of a portion of the streaming multiprocessor of FIG. 3B, according to one embodiment of the present disclosure.

FIG. 3C is a block diagram of the SM 310 of FIG. 3B, according to one embodiment of the present disclosure. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Instruction Scheduling

Figure 4:
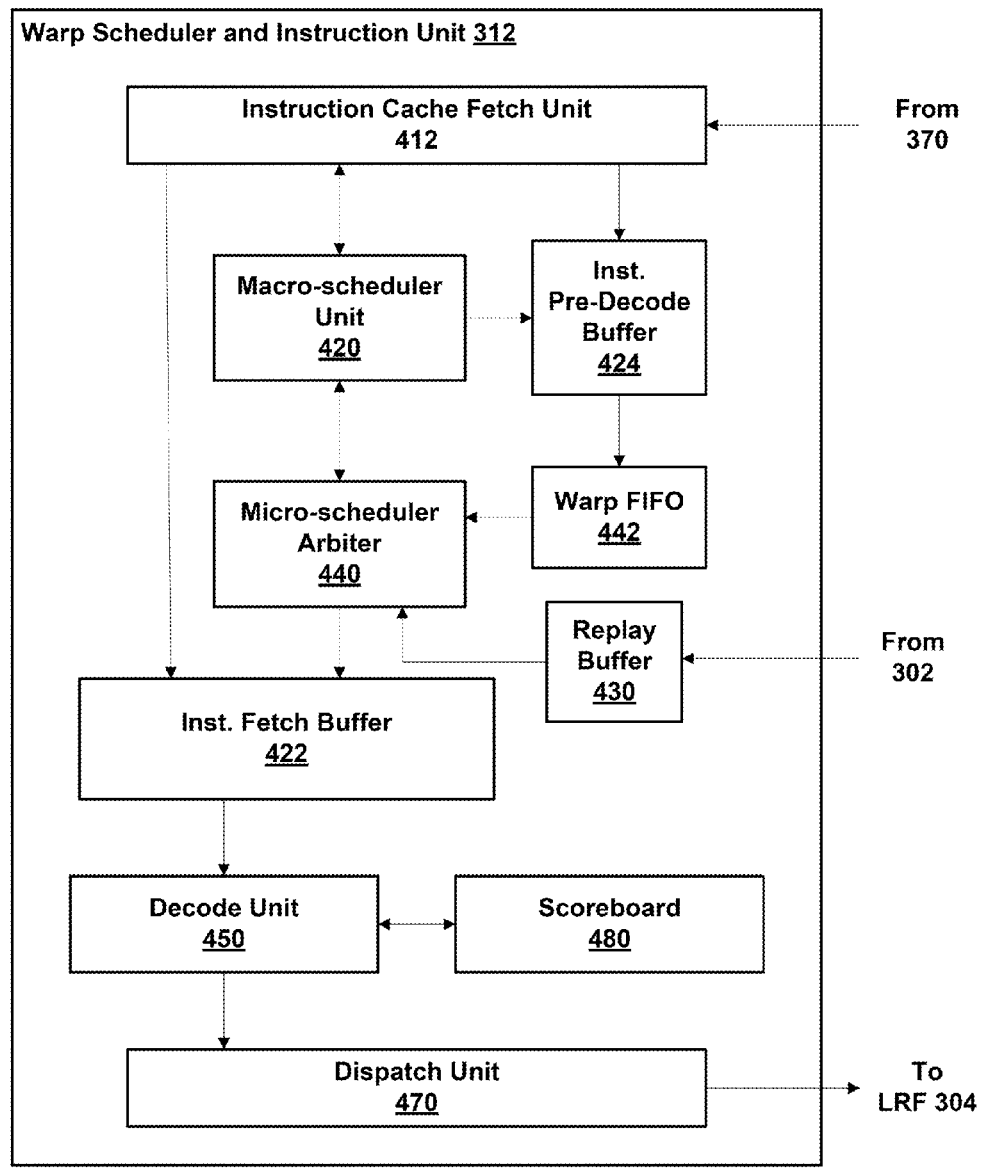
FIG. 4 is a block diagram of the warp scheduler and instruction unit of FIG. 3C, according to one example embodiment of the present disclosure.

FIG. 4 is a block diagram of the warp scheduler and instruction unit 312 of FIG. 3C, according to one example embodiment of the present disclosure. As shown in FIG. 4, the warp scheduler and instruction unit 312 includes an instruction cache fetch unit 412 that is configured to fetch cache lines containing the instructions for warps from the instruction L1 cache 370. In one embodiment, each cache line is 512 bits wide, storing eight instructions (64 bits wide) in a single cache line. The instruction cache fetch unit 412 routes instructions fetched from the instruction L1 cache 370 to the instruction fetch buffer (IFB) 422 for temporary storage without decoding the instructions. In addition, the instruction cache fetch unit 412 routes pre-decode data associated with the instructions to the instruction pre-decode buffer (IPB) 424 and the macro-scheduler unit 420. The pre-decode data may encode a latency value (predetermined by a compiler) associated with the instruction (e.g., executing this instruction will require 4 clock cycles before the next instruction from the warp may execute). The pre-decode data may indicate that the instruction must be issued in the same scheduling cycle as the next instruction. The pre-decode data may indicate that the instruction and the next instruction should be issued in consecutive scheduling cycles. Finally, the pre-decode data may adjust a selection priority level for the instruction to increase or decrease the likelihood that the instruction is selected to be issued when an instruction for another thread group is not eligible to be issued.

In one embodiment, the pre-decode data may be generated by decoding only a portion of the instruction (e.g., decoding the first 3 bits of the instruction). It will be appreciated that decoding only this small portion of the instruction is much more efficient than decoding the entire 64-bit instruction, either in the number of clock cycles required to perform the decode operation or in the amount of physical logic circuitry in the SM 310. In another embodiment, the pre-decode data may be included as a separate instruction in the cache line. For example, the ISA (instruction set architecture) for the PPU 202 may define a special instruction (ss-inst) that, when decoded by PPU 202 for execution, is the equivalent of a NOP (No Operation Performed) instruction.

When a program is compiled to produce the machine code for executing various threads on PPU 202, the compiler may be configured to write an ss-inst instruction to the beginning of every row of memory (where each row of memory corresponds to the width of the cache line). The ss-inst may include an 8-bit opcode that identifies the instruction as an ss-inst instruction as well as seven 8-bit values that store the pre-decode data for each of the other seven instructions written to the corresponding row of memory. In yet other embodiments, pre-decode data may be passed to the macro-scheduler unit 420 and the IPB 424 by other technically feasible means, such as by writing the pre-decode data to special registers in PPU 202.

In one embodiment, IPB 424 implements a simple read scheduler to ensure that warp FIFO 442 is not empty. In one embodiment, warp FIFO 442 may be implemented as a number of FIFOs that store ss-inst instructions corresponding to each of the warps scheduled to execute on SM 310. IPB 424 enables cache fetches to be performed asynchronously from instruction dispatch to the logical units of SM 310. Macro-scheduler unit 420 maintains a priority associated with each of the warps scheduled on SM 310 and performs a sort of the pre-decode data associated with fetched instructions based on the priorities. For example, macro-scheduler unit 420 may maintain a 6-bit or a 10-bit priority value associated with each of 16 different warps scheduled on SM 310 at any given time. The priority may be assigned based on various factors. In one embodiment, priority may be based on when the warp was scheduled on SM 310 (i.e., the longest pending warp may have the highest priority). In other embodiments, the priority may for each warp may be specified by the program that is defined by the instructions executed by the warp.

In one embodiment, macro-scheduler unit 420 performs a new sort every j number of clock cycles. For example, for 16 warps, macro-scheduler unit 420 may perform a priority sort every 4 clock cycles. In the first clock cycle, macro-scheduler unit 420 may sample the current priority value for each of the 16 pending warps, the starting order of the priorities is based on the previous sort order. In the second clock cycle, macro-scheduler unit 420 compares and swaps warps 0 and 2, warps 1 and 3, warps 4 and 6, . . . , and warps 13 and 15 based on priority values associated with the two warps (with warp 0 corresponding to the highest priority value and warp 15 corresponding to the lowest priority value). In the third clock cycle, macro-scheduler unit 420 compares and swaps warps 0 and 1, warps 2 and 3, warps 4 and 5, . . . , and warps 14 and 15, based on priority value. In the fourth clock cycle, macro-scheduler unit 420 compares and swaps warps 1 and 2, warps 3 and 4, . . . , and warps 13 and 14. The new order based on this priority sort is then used to determine from which warp to dispatch the next instruction by the micro-scheduler arbiter 440.

Micro-scheduler arbiter 440 selects an instruction stored in IFB 422 based on a priority adjustment of the warp order generated by the macro-scheduler unit 420 and the pre-decode data. The micro-scheduler arbiter 440 does not necessarily select the instructions in the new order that is specified by the macro-scheduler unit 420. When a first instruction can be issued based on the pre-decode data, the instruction is issued by the micro-scheduler arbiter 440. When the first instruction cannot be issued based on the pre-decode data, the micro-scheduler arbiter 440 determines if an instruction for a different warp may be issued based on the pre-decode data for the respective instruction. In some cases, the first instruction can be issued, but the pre-decode data specifies that the first instruction is low priority, so that another instruction (from a different warp) may be issued instead. In all cases, the instructions for each individual warp are issued in the order that the instructions for the respective individual warp are received from the macro-scheduler unit 420. Therefore, for any scheduling cycle, the micro-scheduler arbiter 440 considers the first instruction in the new order provided by the macro-scheduler unit 420 for selection. Depending on the pre-decode data for the first instruction, the micro-scheduler arbiter 440 may select an instruction from a different warp.

The micro-scheduler arbiter 440 maintains a state model of SM 310 that is updated based on the issued instructions. The state model allows the micro-scheduler arbiter 440 to select instructions based on dynamic execution of the program and the availability of resources within SM 310. For example, a SM 310 or functional unit within an SM 310 that will execute the instruction may be identified as a resource needed for the instruction and the availability of the resource may be used by the micro-scheduler arbiter 440.

Once the micro-scheduler arbiter 440 selects the next instruction to issue, the micro-scheduler arbiter 440 causes the instruction to be routed from the IFB 422 to the decode unit 450. In some embodiments, depending on the architecture of SM 310, instructions may be dual or quad issued, meaning that more than one instruction may be issued and decoded in a particular clock cycle.

Decode unit 450 receives the next instruction to be dispatched from IFB 422. The decode unit 450 performs a full decode of the instruction and transmits the decoded instruction to the dispatch unit 470. Again, in some embodiments, instructions may be dual or quad issued and decode unit 450 may implement separate decode logic for each issued instruction. Dispatch unit 470 implements a FIFO and writes the decoded values to local register file 304 for execution by execution units 302 or load/store units 303. In embodiments that issue multiple instructions simultaneously, dispatch unit 470 may issue each instruction to a different portion of the functional units of SM 310. Scoreboard unit 480 manages and tracks the number of instructions that have been decoded and dispatched per thread group.

The warp scheduler and instruction unit 312 may also include a replay buffer 430. In some instances, an instruction dispatched by dispatch unit 470 may be rejected by the functional execution units in SM 310. In these instances, instead of re-fetching the instruction and re-decoding the instruction, the decoded instruction may be stored in the replay buffer 430 to be issued and dispatched again at a later clock cycle. Instructions that were speculatively issued and are not executed may need to be reissued and are input to the replay buffer 430. An instruction may not be executed due to a cache miss or an incorrect branch. Rather than waiting for the cache miss to be resolved, and causing already issued instructions behind the instruction to be delayed, the instruction is reissued at a later time.

The micro-scheduler arbiter 440 receives instructions to be reissued from the replay buffer 430. The micro-scheduler arbiter 440 is typically configured to select a reissue instruction from the replay buffer 430 over any instructions in the warp FIFO 442. However, the pre-decode data for the first instruction in the warp FIFO 442 may specify that the first instruction should be selected by the micro-scheduler arbiter 440 even when a reissue instruction is available.

Figure 5A:
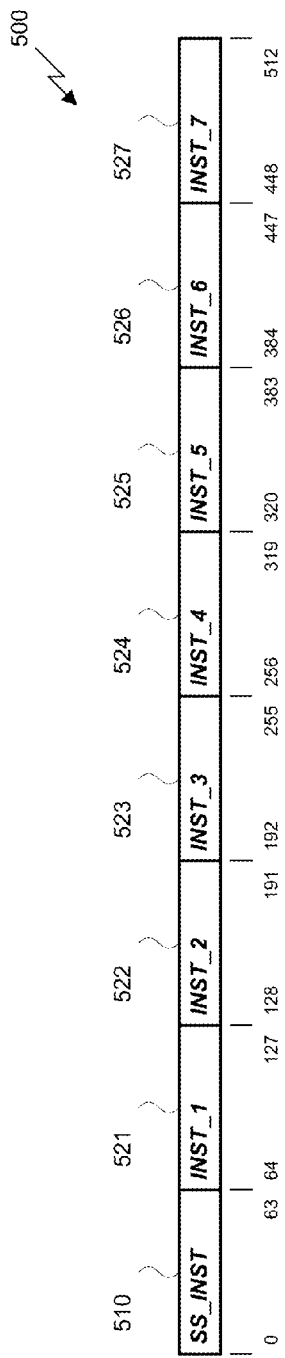
FIG. 5A illustrates a cache line fetched from the instruction L1 cache, according to one example embodiment of the present disclosure.

FIG. 5A illustrates a cache line 500 fetched from the instruction L1 cache 370, according to one example embodiment of the present disclosure. As shown, cache line 500 is 512 bits wide and includes eight instructions. Bits 0 through 63 store a special instruction (ss-inst) 510, similar to the instruction described above in FIG. 4, that includes pre-decode data associated with each of the other seven instructions in cache line 500. In addition to the ss-inst 510, bits 64 through 127 of cache line 500 store a first instruction (inst_1) 521, bits 128 through 191 store a second instruction (inst_2) 522, bits 192 through 255 store a third instruction (inst_3) 523, bits 256 through 319 store a fourth instruction (inst_4) 524, bits 320 through 383 store a fifth instruction (inst_5) 525, bits 384 through 447 store a sixth instruction (inst_6) 526, and bits 448 through 512 store a seventh instruction (inst_7) 527. It will be appreciated that the size of cache line 500 may vary in different embodiments. For example, in one embodiment, instructions may be 32-bits wide and cache line 500 may be 256-bits wide. In other embodiments, the amount of pre-decode data may be longer than 8-bits per instruction and, therefore, driver 103 may write two consecutive ss-inst instructions to bits 0 through 128 of cache line 500 and six instructions in bits 128 through 512, where each ss-inst provides pre-decode data for three of the six instructions in the cache line 500.

Figure 5B:
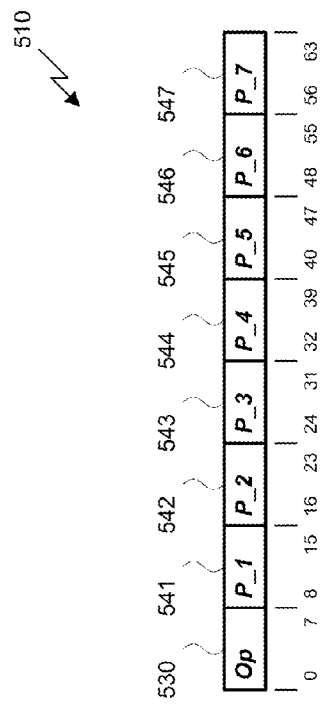
FIG. 5B illustrates the special instruction ss-inst of FIG. 5A, according to one example embodiment of the present disclosure.

FIG. 5B illustrates the special instruction ss-inst 510 of FIG. 5A, according to one example embodiment of the present disclosure. As shown in FIG. 5B, ss-inst 510 includes an opcode 530 that is 8-bits wide and stored at bits 0 through 7 of ss-inst 510. The ss-inst 510 instruction also includes pre-decode data for seven instructions associated with ss-inst 510. A first set of pre-decode data (P_1) 541 is stored at bits 8 through 15, a second set of pre-decode data (P_2) 542 is stored at bits 16 through 23, a third set of pre-decode data (P_3) 543 is stored at bits 24 though 31, a fourth set of pre-decode data (P_4) 544 is stored at bits 32 through 39, a fifth set of pre-decode data (P_5) 545 is stored at bits 40 through 47, a sixth set of pre-decode data (P_6) 546 is stored at bits 48 through 55, and a seventh set of pre-decode data (P_7) 547 is stored at bits 56 through 63. As discussed briefly above, pre-decode data 541-547 may encode one or more values associated with scheduling information for a corresponding instruction. For example, the pre-decode data may encode a latency value with four bits (i.e., a value between 0 and 15) and a special scheduling hint with the other four bits, such as a code that indicates to the warp scheduler and instruction unit 312 that no additional instructions from the same warp should be issued after the corresponding instruction for at least 8 scheduling cycles.

There are four different types of scheduling hints that are encoded in the pre-decode data for an instruction, e.g., default, pair, hold, and wait. The default scheduling hint is defined (fixed or programmed) and used for instructions for which specify the default scheduling hint. The pair scheduling hint specifies that the first instruction should be issued in the same scheduling cycle with the next instruction for the same warp. The hint specified for the next instruction is applied to the first instruction that is paired with the next instruction. The hold scheduling hint specifies that the first instruction should be selected before an instruction for any other warp. Additionally, the hold scheduling hint also specifies whether or not reissue instructions received from the replay buffer 430 can be selected before the first instruction. In one embodiment, the hold scheduling hint also specifies if the first instruction can be issued even if a previously issued load or store operation has not yet been completed for the warp.

The wait scheduling hint specifies that the micro-scheduler arbiter 440 should wait w issuing cycles before issuing the first instruction. Additionally, the scheduling hint may indicate that the issuing priority of a particular warp should be boosted for instructions of the warp. Conversely, the scheduling hint may indicate that the issuing priority of a particular warp should be decreased, so that the warp yields to allow instructions for other warps to issue for a given instruction. The scheduling priority for instructions of the warp is increased or decreased after the number of scheduling cycles specified for the wait scheduling hint has transpired. When the priority for instructions of the warp is decreased, a specific number of scheduling cycles may be specified, after which the scheduling priority is increased back to a neutral level. When the instruction corresponding to the wait scheduling hint issues, the scheduling priority for the warp may be changed when another instruction for the warp is the first instruction provided to the micro-scheduler arbiter 440 from the warp FIFO 442. Finally, the scheduling hint may also indicate whether the instruction is likely to be reissued one or more times when one or more threads in the warp diverge during execution.

The different types of pre-decode data and options for each scheduling hint are shown in TABLE 1.

pre-decode data for the other instructions stored in the cache line. At step 612, the warp scheduler and instruction unit 312 stores the instructions in IFB 422 within the warp scheduler and instruction unit 312. At step 614, the warp scheduler and instruction unit 312 transmits pre-decode data to IPB 424. In one embodiment, the pre-decode data is generated by performing a partial decode of the instruction. In another embodiment, the pre-decode data is read from a special instruction included in the cache line. In yet another embodiment, the pre-decode data may be read from a special location in memory.

At step 616, a macro-scheduler unit 420 included in the warp scheduler and instruction unit 312 performs a priority sort to determine an order of the two or more thread groups. In one embodiment, warp scheduler and instruction unit 312 may manage up to sixteen different thread groups for parallel execution. The order of the thread groups represents the

TABLE 1 scheduling hint types and options

| Encoding | Scheduling Hint | Option | Description |
| --- | --- | --- | --- |
| 00000000 | DEFAULT | None | Use the default scheduling hint |
| 00000100 | PAIR | None | Issue this instruction in the same scheduling cycle as the next instruction |
| 00000101 | HOLD | IFB | Issue this instruction before issuing any other instruction in the IFB 422 |
| 00000110 | HOLD | ALL | Issue this instruction before issuing any other instruction (including a reissue instruction) |
| 00000111 | HOLD | IFB + Reorder | Issue this instruction before issuing any other instruction in the IFB 422 and without waiting for in-flight load or store operations to complete |
| 001WWWWW | WAIT | | Wait for at least w = WWWWW + 1 scheduling cycles before issuing the instruction |
| 010WWWWW | WAIT | Reorder | Wait for at least w = WWWWW + 1 scheduling cycles before issuing the instruction and issue without waiting for in-flight load or store operations to complete |
| 011WWWWW | WAIT | Replay | Wait for at least w = WWWWW + 1 scheduling cycles before issuing the instruction |
| 111WWWWW | WAIT | Boost | Wait for at least w = WWWWW + 1 scheduling cycles before issuing the instruction, boost the scheduling priority for the warp after w scheduling cycles |
| 1YYYWWWW | WAIT | Yield YYY ≤ 5 | Wait for at least w = WWWW + 1 scheduling cycles before issuing the instruction, reduce the scheduling priority for the warp for y = YYY scheduling cycles and then reset the scheduling priority for the warp(y = 0 resets the scheduling priority for the warp) |

Figure 6:
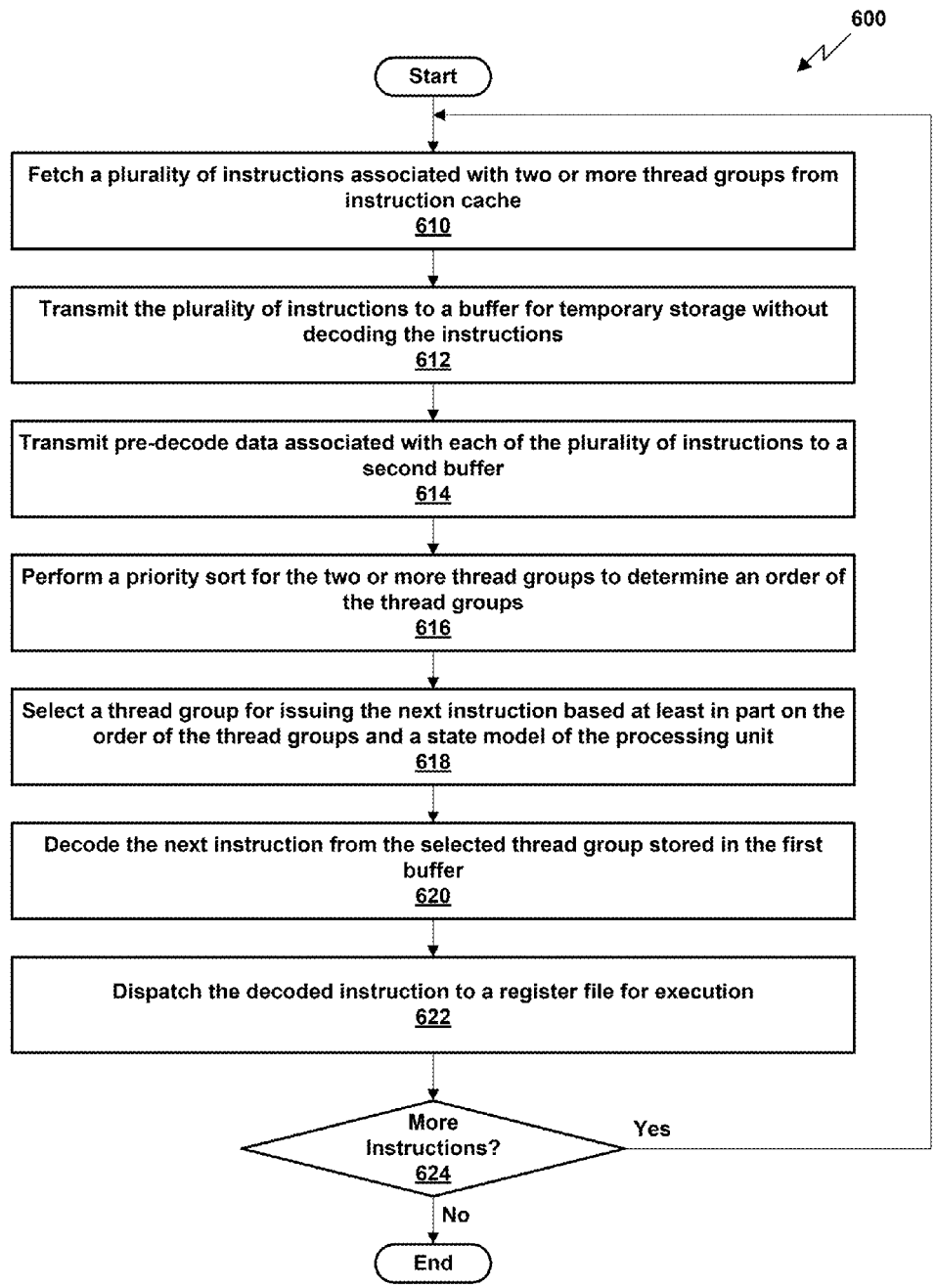
FIG. 6 illustrates a method for scheduling instructions without instruction decode, according to one example embodiment of the present disclosure.

FIG. 6 illustrates a method 600 for scheduling instructions without instruction decode, according to one example embodiment of the present disclosure. Although the method steps are described in conjunction with the systems of FIGS. 1, 2, 3A-3C, 4 and 5 persons of ordinary skill in the art will understand that any system configured to perform the method steps, in any order, is within the scope of the disclosure.

Method 600 begins at step 610, where warp scheduler and instruction unit 312 fetches a plurality of instructions associated with two or more thread groups from instruction L1 cache 370. Each fetch may retrieve a cache line containing a number of distinct instructions stored in the same cache line. In one embodiment, the first instruction of the cache line is a special instruction (ss-inst) 510 that includes the priority of each thread group for scheduling decisions. The macro-scheduler unit 420 may assign a 6-bit priority value to each of the thread groups. Macro-scheduler unit 420 sorts the pre-decode data in IPB 422 into warp FIFO 442 according to the thread group priority values, generating an order of instructions for the thread groups. At step 618, a micro-scheduler arbiter 440 included in the warp scheduler and instruction unit 312 selects an instruction for execution based at least in part on the order of the thread groups and the pre-decode data in the warp FIFO 442.

At step 620, decode unit 450 included in the warp scheduler and instruction unit 312 decodes the selected instruction for execution on SM 310. In one embodiment, decode unit 450 may implement two or more separate and distinct logic blocks for decoding multiple instructions in parallel. At step 622, dispatch unit 470 transmits the decoded instructions to local register file 304 for execution by the functional units of SM 310. At step 624, warp scheduler and instruction unit 312 determines whether there are more pending instructions in IFB 422. If there are more pending instructions, then method 600 returns to step 610 and another instruction is selected for execution. However, if there are no pending instructions in IFB 422, then method 600 terminates.

One advantage of the disclosed system is that the decode unit only decodes the next instruction that is to be scheduled, reducing latencies introduced by waiting until a plurality of instructions have been decoded before determining which instruction to schedule. Another advantage of the disclosed system is that performing a priority sort with the macro-scheduler unit prior to adjusting the order of the thread groups with the micro-scheduler arbiter greatly reduces the amount of logic needed to implement the scheduling algorithm, requiring only a quick tree traversal of the sorted thread groups to determine the highest priority instruction ready to be dispatched.

Figure 7:
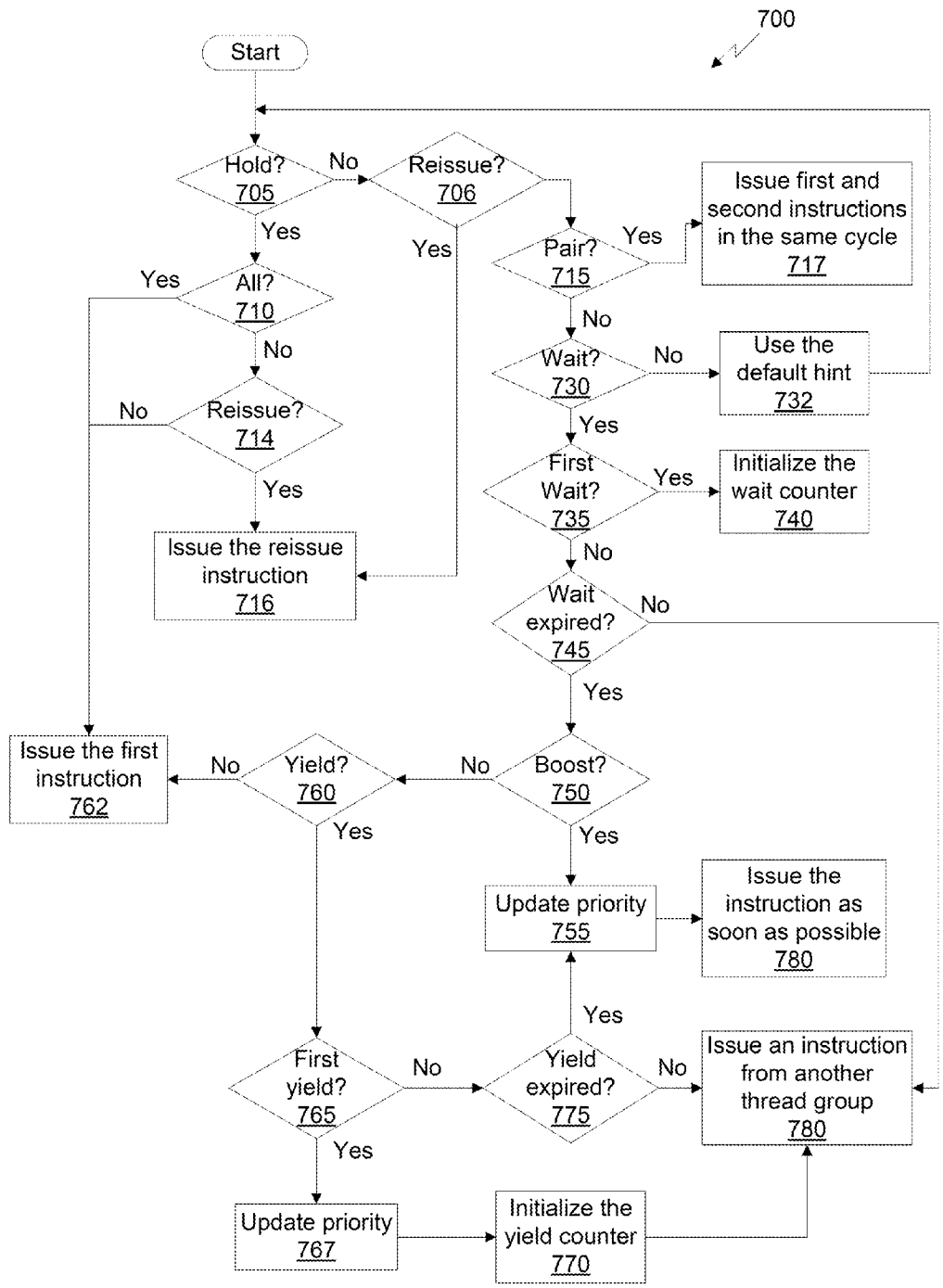
FIG. 7 illustrates a method for scheduling instructions using the pre-decode data, according to one example embodiment of the present disclosure.

FIG. 7 illustrates a method 700 for scheduling instructions using the pre-decode data, according to one example embodiment of the present disclosure. The steps shown in method 700 may be used to perform at least a portion of step 618 of FIG. 6. Although the method steps are described in conjunction with the systems of FIGS. 1, 2, 3A-3C, 4 and 5 persons of ordinary skill in the art will understand that any system configured to perform the method steps, in any order, is within the scope of the disclosure.

The method 700 is performed by the micro-scheduler arbiter 440 for each scheduling cycle. Method 700 begins at step 705, where the micro-scheduler arbiter 440 determines if the pre-decode data encodes a hold scheduling hint, and, if so, then at step 710 the micro-scheduler arbiter 440 determines if the "all" option is specified for the hold scheduling hint. If the "all" option is specified, then at step 762, the micro-scheduler arbiter 440 issues the first instruction. The first instruction is issued even if a reissue instruction is available to be issued.

If, at step 710 the micro-scheduler arbiter 440 determines that the "all" option is not specified for the hold scheduling hint, then the IFB option is specified for the hold scheduling hint, and, at step 714 the micro-scheduler arbiter 440 determines if a reissue instruction is available in the replay buffer 430. If, a reissue instruction is not available in the replay buffer 430, then at step 762 the micro-scheduler arbiter 440 issues the first instruction. If, at step 714 a reissue instruction is available in the replay buffer 430, then at step 716 the micro-scheduler arbiter 440 issues the reissue instruction.

Returning back to step 705, if the micro-scheduler arbiter 440 determines that the pre-decode data does not encode a hold scheduling hint, then at step 706 the micro-scheduler arbiter 440 determines if a reissue instruction is available in the replay buffer 430. If, a reissue instruction is available in the replay buffer 430, then at step 716 the micro-scheduler arbiter 440 issues the reissue instruction.

If, at step 706 the micro-scheduler arbiter 440 determines that a reissue instruction is not available in the replay buffer 430, then at step 715 the micro-scheduler arbiter 440 determines if the pair scheduling hint, and, if so, at step 717 the first and second instructions are issued in the same scheduling cycle. The first instruction is the first instruction in the new ordering of instructions for the warps that is provided to the micro-scheduler arbiter 440 by the macro-scheduler unit 420. The second instruction is the second instruction for the same warp as the first instruction. In other words, the second instruction is not necessarily the second instruction in the new ordering of instructions.

If, at step 715, the micro-scheduler arbiter 440 determines that the pre-decode data does not encode a pair scheduling hint, then at step 730 the micro-scheduler arbiter 440 determines if the pre-decode data encodes a wait scheduling hint. If the pre-decode data does not encode a wait scheduling hint, then the pre-decode data encodes that the default scheduling hint should be used. The default scheduling hint may be the pair, wait, or hold scheduling hint with the associated options. At step 732 the micro-scheduler arbiter 440 uses the default scheduling hint and returns to step 705 to determine the scheduling hint that is specified by the default scheduling hint.

If, at step 730 the micro-scheduler arbiter 440 determines that the pre-decode data encodes a wait scheduling hint, then at step 735 the micro-scheduler arbiter 440 if the first instruction is a new instruction that has not been considered for selection in a previous scheduling cycle. If, the first instruction is a new instruction, then at step 740 the wait counter for the warp is initialized based on the w value specified for the wait scheduling hint. The wait counter for the warp is updated (decremented or incremented) each scheduling cycle. The first instruction will not issue until after at least w scheduling cycles have transpired. If, at step 735, the micro-scheduler arbiter 440 determines that the first instruction is not a new instruction, then at step 745 the micro-scheduler arbiter 440 determines if the wait counter for the warp has expired, indicating that w scheduling cycles have transpired for the first instruction. If, at step 745 the wait counter has not expired, then at step 780 an instruction from another warp is issued.

If, at step 745 the micro-scheduler arbiter 440 determines that the wait counter for the warp has expired, then at step 750 the micro-scheduler arbiter 440 determines if the boost option is specified for the wait scheduling hint. When the boost option is specified, at step 755 the micro-scheduler arbiter 440 updates the priority for the warp to increase the scheduling priority. At step 780 the first instruction is issued as soon as possible.

When the boost option is not specified, at step 760 the micro-scheduler arbiter 440 determines if the yield option is specified for the wait scheduling hint. If the yield option is not specified, at step 762 the first instruction is issued. Otherwise, at step 765 the micro-scheduler arbiter 440 determines if the wait counter has just expired for the first instruction. When the wait counter has just expired for the warp, then the yield counter should be initialized. At step 767 the scheduling priority for the warp is updated. At step 770 the yield counter for the warp is initialized based on the y value specified for the wait scheduling hint. The yield counter for the warp is updated (decremented or incremented) each scheduling cycle until y scheduling cycles have transpired. While the scheduling priority for the warp is reduced, the micro-scheduler arbiter 440 will select an instruction for a different warp that has a higher scheduling priority. Thus, at step 780 the micro-scheduler arbiter 440 issues an instruction for a different warp.

Returning to step 765, when the micro-scheduler arbiter 440 determines that the wait counter has not just expired, then the yield counter has already been initialized for the warp and at step 775, the micro-scheduler arbiter 440 determines if the yield counter for the warp has expired, indicating that y scheduling cycles have transpired for the first instruction. If, at step 775 the yield counter has not expired, then at step 780 an instruction from another warp is issued. Otherwise, at step 755 the priority for the warp is updated to the neutral value.

The pre-decode data encodes scheduling hints for use during runtime to control when instructions are issued for execution relative to other instructions for the same warp and to adjust priority levels to control how the micro-scheduler arbiter 440 selects instructions for issuing between different warps. The scheduling hints are determined by a compiler. The scheduling hints may specify a number of scheduling cycles to wait before scheduling the instruction and may also specify a scheduling priority for the instruction. Once the micro-scheduler arbiter 440 selects an instruction to issue for execution, a decode unit fully decodes the instruction. Decoding only the pre-decode data portion of the instruction to control the scheduling of the instruction is much more efficient than decoding the entire 64-bit instruction and analyzing the sequence of instructions for each warp.

One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The disclosure has been described above with reference to specific embodiments. Persons of ordinary skill in the art, however, will understand that various modifications and changes may be made thereto without departing from the broader spirit and scope of the disclosure as set forth in the appended claims. The foregoing description and drawings are, accordingly, to be regarded in an illustrative rather than a restrictive sense.

What is claimed is:

1. A computer-implemented method for scheduling instructions within a parallel computing machine, the method comprising:
   fetching instructions corresponding to two or more thread groups from an instruction cache unit;
   receiving pre-decode data encoded in each one of the instructions, wherein the pre-decode data is determined when the instructions are compiled;
   partially decoding a first instruction to decode only the pre-decode data in the first instruction;
   selecting, at runtime, the first instruction to issue for execution by a parallel processing unit based at least in part on the pre-decode data, the pre-decode data comprising information utilized for scheduling of the execution of the first instruction relative to execution of the other instructions;
   completing the decoding of the first instruction; and
   dispatching the first instruction to the parallel processing unit for execution.

2. The method of claim 1, wherein the pre-decode data encodes a wait scheduling hint comprising a number of scheduling cycles that transpire before the first instruction is issued for execution.

3. The method of claim 2, wherein the wait scheduling hint specifies a scheduling priority option that changes the scheduling priority for a first thread group of the two or more thread groups that is associated with the first instruction.

4. The method of claim 1, wherein the pre-decode data specifies that a default scheduling hint is used to schedule the first instruction.

5. The method of claim 1, wherein the pre-decode data encodes a hold scheduling hint that configures a scheduling unit to select the first instruction to issue over an earlier issued instruction that failed to execute and is a reissue instruction available to be issued.

6. The method of claim 1, wherein the pre-decode data encodes a hold scheduling hint that configures a scheduling unit to select to issue, over the first instruction, an earlier issued instruction that failed to execute and is a reissue instruction available to be issued.

7. The method of claim 1, wherein the pre-decode data encodes a pair scheduling hint that configures a scheduling unit to select to issue the first instruction and a second instruction in a single scheduling cycle, and wherein the first instruction and the second instruction are associated with a first thread group of the two or more thread groups.

8. A scheduling unit, comprising:
   an instruction cache fetch unit that is configured to route instructions corresponding to two or more thread groups to a first buffer and route pre-decode data associated with each one of the instructions to a second buffer;
   a macro-scheduler unit that is coupled to the instruction cache fetch unit and configured to receive pre-decode data, wherein the pre-decode data is determined when the instructions are compiled;
   a micro-scheduler arbiter that is coupled to the macro-scheduler unit and the second buffer and configured to select, at runtime, a first instruction for execution by a processing unit based at least in part on the pre-decode data, the pre-decode data comprising information utilized for scheduling the execution of the first instruction relative to execution of the other instructions;
   a decode unit coupled to the first buffer and configured to decode the first instruction by partially decoding the first instruction to decode only the pre-decode data in the first instruction, and subsequently completing the decoding of the first instruction; and
   a dispatch unit coupled to the decode unit and configured to dispatch the first instruction to a processing unit for execution.

9. The scheduling unit of claim 8, wherein the pre-decode data encodes a wait scheduling hint comprising a number of scheduling cycles that transpire before the first instruction is issued for execution.

10. The scheduling unit of claim 9, wherein the wait scheduling hint specifies a scheduling priority option that changes the scheduling priority for a first thread group of the two or more thread groups that is associated with the first instruction.

11. The scheduling unit of claim 8, wherein the pre-decode data specifies that a default scheduling hint is used to schedule the first instruction.

12. The scheduling unit of claim 8, wherein the pre-decode data encodes a hold scheduling hint that configures a scheduling unit to select the first instruction to issue over an earlier issued instruction that failed to execute and is a reissue instruction available to be issued.

13. The scheduling unit of claim 8, wherein the pre-decode data encodes a hold scheduling hint that configures a scheduling unit to select to issue, over the first instruction, an earlier issued instruction that failed to execute and is a reissue instruction available to be issued.

14. A computing device comprising:
a parallel processing unit that includes a scheduling unit configured to:
fetch instructions corresponding to two or more thread groups from an instruction cache unit;
receive pre-decode data encoded in each one of the instructions, where the pre-decode data is determined when the instructions are compiled;
partially decode a first instruction to decode only the pre-decode data in the first instruction;
select, at runtime, the first instruction for execution by a processing unit based at least in part on the pre-decode data, the pre-decode data comprising information utilized for scheduling of the execution of the first instruction relative to execution of the other instructions;
complete the decoding of the first instruction; and
dispatch the instruction to the parallel processing unit for execution.

15. The computing device of claim 14, wherein the pre-decode data encodes a wait scheduling hint comprising a number of scheduling cycles that transpire before the first instruction is issued for execution.

16. The computing device of claim 15, wherein the wait scheduling hint specifies a scheduling priority option that changes the scheduling priority for a first thread group of the two or more thread groups that are associated with the first instruction.

17. The computing device of claim 14, wherein the pre-decode data specifies that a default scheduling hint is used to schedule the first instruction.

18. The computing device of claim 14, wherein the pre-decode data encodes a hold scheduling hint that configures a scheduling unit to select the first instruction to issue over an earlier issued instruction that failed to execute and is a reissue instruction available to be issued.

19. The computing device of claim 14, wherein the pre-decode data encodes a hold scheduling hint that configures a scheduling unit to select to issue, over the first instruction, an earlier issued instruction that failed to execute and is a reissue instruction available to be issued.

20. The computing device of claim 14, wherein the pre-decode data encodes a pair scheduling hint that configures a scheduling unit to select to issue the first instruction and a second instruction in a single scheduling cycle, and wherein the first instruction and the second instruction are associated with a first thread group of the two or more thread groups.

* * * * *

UNITED STATES PATENT AND TRADEMARK OFFICE
CERTIFICATE OF CORRECTION

PATENT NO. : 9,798,548 B2
APPLICATION NO. : 13/333879
DATED : October 24, 2017
INVENTOR(S) : Jack Hilaire Choquette, Robert J. Stoll and Olivier Giroux Page 1 of 1

It is certified that error appears in the above-identified patent and that said Letters Patent is hereby corrected as shown below:

On the Title Page

Item (56) References Cited:
Please delete "NVidia, NVidia's Next Generation CUDA Compute Architecture: Fermi, 2009, pp. 1-21" and insert --NVIDIA, NVIDIA's Next Generation CUDA Compute Architecture: Fermi, 2009, pp. 1-21--.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*